United States Patent [19]
Bechler et al.

[11] Patent Number: 5,853,282
[45] Date of Patent: Dec. 29, 1998

[54] SCOOTER LIFT

[75] Inventors: Ronald F. Bechler; Kary D. Conaway, both of George, Iowa

[73] Assignee: Ranger All Season Corporation, George, Iowa

[21] Appl. No.: 904,202

[22] Filed: Jul. 31, 1997

Related U.S. Application Data

[60] Provisional application No. 60/022,957 Aug. 1, 1996.

[51] Int. Cl.$^6$ ....................................................... B60P 1/00
[52] U.S. Cl. .......................... 414/543; 212/180; 414/462; 414/921
[58] Field of Search ..................................... 414/539, 540, 414/541, 542, 543, 546, 550, 921; 224/548, 549; 254/4 R, 4 B, 4 C; 212/252, 245, 232, 259, 260, 262, 177, 180

[56] References Cited

U.S. PATENT DOCUMENTS

| | | | |
|---|---|---|---|
| 65,478 | 6/1867 | Elliot | 414/543 |
| 2,615,584 | 10/1952 | Adams | 212/180 X |
| 4,671,729 | 6/1987 | McFarland | 414/462 |
| 4,741,660 | 5/1988 | Kent | 414/462 |
| 4,797,042 | 1/1989 | McFarland | 410/3 |
| 4,991,810 | 2/1991 | Andrus et al. | 248/286 |
| 5,011,361 | 4/1991 | Peterson | 414/462 |
| 5,090,580 | 2/1992 | Nelson | 212/180 |
| 5,114,120 | 5/1992 | Bartelt et al. | 254/323 |
| 5,122,024 | 6/1992 | Stokes | 414/462 |
| 5,147,106 | 9/1992 | Bartelt et al. | 296/202 |
| 5,205,700 | 4/1993 | Lin et al. | 414/540 |
| 5,234,311 | 8/1993 | Loduha, Jr. et al. | 414/546 |
| 5,431,526 | 7/1995 | Peterson et al. | 414/543 |
| 5,445,487 | 8/1995 | Koscinski, Jr. | 414/543 |
| 5,482,424 | 1/1996 | Jones et al. | 414/462 |

FOREIGN PATENT DOCUMENTS

| | | | |
|---|---|---|---|
| 128935 | 8/1983 | Japan | 414/545 |

*Primary Examiner*—Frank E. Werner
*Attorney, Agent, or Firm*—Kinney & Lange, P.A.

[57] ABSTRACT

A scooter lift includes a base assembly for mounting on a surface of the storage area of the transport vehicle. A frame is rotatably mounted on the base assembly to rotate about a substantially vertical axis. A boom is pivotally mounted to the frame for rotation between a lowered and a raised position. A cable has a first end connected to a spool shaft and a second end for attachment to the scooter. The cable is guided by the boom to selectively raise or lower the scooter upon rotation of the spool shaft. The boom may be operated to its raised position to enable movement of the scooter into and out of the storage area, and the boom may be operated to its lowered position to permit storage of the scooter and lift in the vehicle storage area. A lock selectively locks the boom in its lowered and raised positions.

16 Claims, 11 Drawing Sheets

SCOOTER LIFT

CROSS-REFERENCE TO RELATED APPLICATIONS

The application claims priority on U.S. Provisional application Ser. No. 60/022,957 filed Aug. 1, 1996 for "Scooter Lift" by Ronald F. Bechler and Kary D. Conaway.

BACKGROUND OF THE INVENTION

This invention relates to personal mobility vehicle accessories, and more specifically, to an effortless, single-user, and convenient scooter lift that permits raising, shifting, and lowering of a scooter into a transport vehicle.

Personal mobility vehicles have gained widespread acceptance for use by elderly persons or persons with partial or total disabilities. Self-propelled scooters are among the most popular personal mobility vehicles. As the use of scooters has increased, so has the need to transport such scooters to remote locations. Scooters are typically transported and stored in the storage area or trunk of another transport vehicle, such as a minivan or automobile.

The transportation and storage of scooters presents numerous problems. Transporting a scooter, which often weighs as much or more than the user, requires its placement inside the storage area of the transport vehicle. Since most scooter users are elderly or partially handicapped persons, manually lifting the cumbersome scooter into the transport vehicle storage area can be an arduous task. To rectify these problems, many scooter users employ complex mechanical lifting systems to raise, shift, and lower the unwieldly scooter into the transport vehicle. Examples of such lifting systems include hoists, winches, cranes, lifting springs, or any other appropriate lifting system and can be found in U.S. Pat. Nos. 5,431,526 to Peterson, 4,991,810 to Androus, and 5,205,700 to Lin. However, the prior art mandates a sophisticated level of manual dexterity to both assemble and operate these lifting systems. Additionally, prior art lift systems require substantially user strength to properly position the scooter. Typically, the user must manually maneuverer (using both arms) the scooter into the transport vehicle. Further, prior art lifting systems are structurally limited as assembly and disassembly of these complex mechanical devices is often a complicated and time-consuming procedure.

The present invention overcomes the difficulties of the prior art by providing an easily-operable scooter lift requiring only one hand to raise and lower the scooter. The present invention is also quickly and easily assembled and disassembled.

SUMMARY OF THE INVENTION

In one embodiment of the present invention, a scooter lift includes a base assembly for mounting on a surface of the storage area of the transport vehicle. A boom is movable between raised and lowered positions, and a cable has a first end connected to a spool shaft and a second end for attachment to the scooter. The cable is guided by the boom to selectively raise or lower the scooter upon rotation of the spool shaft. Means positions the boom relative to the base assembly, and means locks the boom in its raised and lowered positions.

In accordance with another embodiment of the present invention, a scooter lift includes a base assembly for mounting on a surface of the storage area of the transport vehicle. A frame is rotatably mounted on the base assembly to rotate about a substantially horizontal axis. A boom is pivotally mounted to the frame for rotation about substantially horizontal axis between a lowered and a raised position. A cable has a first end connected to a spool shaft and a second end for attachment to the scooter. The cable is guided by the boom to selectively raise or lower the scooter upon rotation of the spool shaft. The boom may be operated to its raised position to enable movement of the scooter into and out of the storage area, and the boom may be operated to its lowered position to permit storage of the scooter lift in the vehicle storage area. A lock selectively locks the boom in its lowered and raised positions.

In one embodiment, the lock includes an engagement member attached to the boom and moveable between a lower rest position and an uppermost position and between the uppermost position and an upper rest position. Directional means is pivotally mounted to the frame to direct the engagement member from its uppermost position toward its upper rest position and to block movement of the engagement member from its uppermost position toward its lower rest position when the engagement member is moved from its lower rest position to the uppermost portion. The directional means further release blockage of movement of the engagement member from its uppermost position to its lower rest position when the engagement member is in its upper rest position so that when the engagement member is moved from its upper rest position to the uppermost position the engagement member is permitted to move to its lower rest position.

In another embodiment, a slot engages the engagement member. The slot has a vertical portion defining lower rest position and uppermost position of the engagement member and has a slot recess extending from the uppermost position and defining the upper rest position of the engagement member. The directional means includes a C-plate having an arm pivotally arranged to direct the engagement member into the slot recess when the engagement member travels the vertical portion to the uppermost portion. A first spring urges the C-plate to permit the engagement member to travel down the vertical portion from the uppermost portion upon movement from the upper rest position.

Optionally, the C-plate has an arm and a cam surface, and the engagement member engages the cam surface when moved from its lower rest position to its uppermost position causing the C-plate to pivot to position the arm to block the slot to prevent movement of the engagement member from the uppermost position to the lower rest position.

Also optionally, a lock engages the arm of the C-plate when the C-plate is pivoted to block the slot, thereby preventing the C-plate from rotating to a position wherein the arm does not block the slot.

In another preferred embodiment, the lock comprises a second spring having a notch for engaging the arm of the C-plate. The engagement member engages the second spring when the engagement member is in its upper rest position to disengage the arm of the C-p-late from the notch so that the first spring urges the C-plate toward a position to permit the engagement member to move from the uppermost portion to the lower rest position so that upon movement of the engagement member to the uppermost position from the upper rest position the main boom may be moved to its lowered position.

BRIEF DESCRIPTION OF THE DRAWINGS

The present invention will be further explained with reference to the attached figures, wherein like structures are referred to by like numerals throughout the several views.

FIG. 5A is an enlarged view of segment 5A in FIG. 5;

While the above-identified drawings set forth several one preferred embodiment, other embodiments of the present invention area also contemplated, as noted in the discussion. This disclosure presents illustrative embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
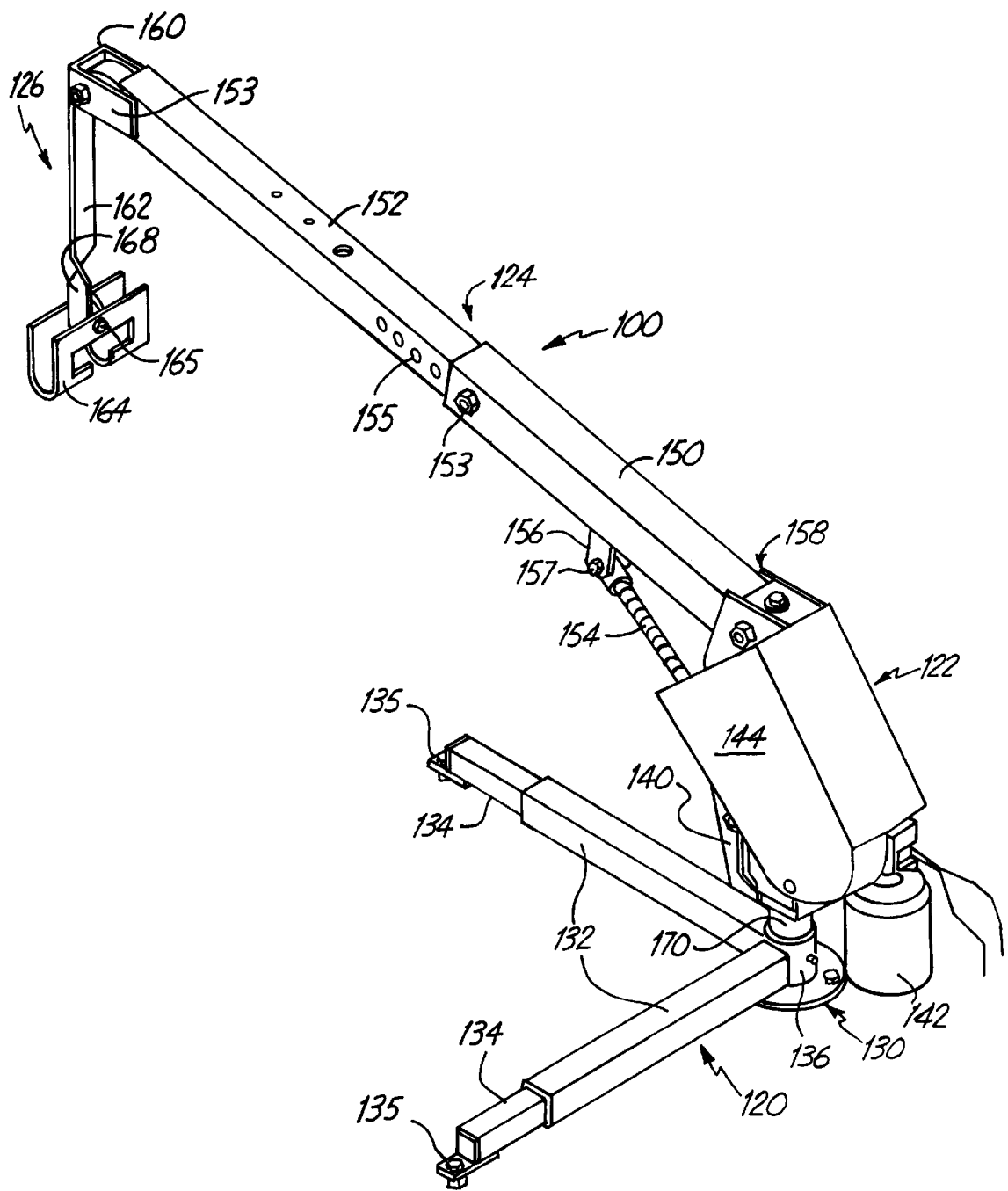
FIG. 1 is a perspective view of a scooter lift of the present invention in an assembled state.

A scooter lift of the present invention is illustrated generally at 100 in FIG. 1. Scooter lift 100 is provided for use with a vehicle for maneuvering a personal mobility scooter into the vehicle. Specifically, scooter lift 100 is provided for moving a scooter from a first position outside the vehicle, into an elevated position, and ultimately into a storage position within the vehicle (e.g., in the vehicle's trunk).

Scooter lift 100 includes a base assembly 120, a drive assembly 122, a boom assembly 124, and a cable assembly 126. Base assembly 120 includes a pedestal base 130, a pair of base supports 132, a pair of base tube extensions 134, a fastening means 135, a receptacle 136, and a vertical post 138.

Drive assembly 122 includes a frame 140, a motor 142, and a shroud 144. Boom assembly 124 includes a main boom 150, a boom extension 152, a boom bracket 153, a threaded rod 154, a first pivotal mounting 156, a fastener 157, and a second pivotal mounting 158. Cable assembly 126 includes a guide wheel 160, a cable 162, a gripper 164, and a fastener 165. Cable 162 further includes an inner end (not shown) and an outer gripper end 168.

Base tube extensions 134 are slidably mounted within base supports 132 and have a length appropriately equal to a length of base supports 132. In a retracted position, base tube extensions 134 extend only slightly outward from the base supports 132. In a fully-extended position, base tube extensions 134 have a length exposed beyond the ends of base supports 132 corresponding to substantially the full length of base tube extensions 134. Each of the base tube extensions 134 has a fastening means 135 provided at an end of each base tube extension 134 to permit secure mounting of base assembly 120 to a support surface of a vehicle or other stable platform. Pedestal base 130 also includes a means for fastening pedestal base 130 to a suitable support platform such as a surface of a vehicle. Vertical post 138 (FIG. 2) is vertically supported with its longitudinal axis oriented approximately orthogonal to a longitudinal axis of base supports 132. Vertical post 138 is securely mounted in receptacle 136.

Frame 140 includes a receptacle (not shown) which slidably mounts on vertical post 138 of base assembly 120. Frame 140 is configured and arranged to permit frame 140 to pivotally rotate about stationary vertical post 138 of base assembly 120. Motor 142 is mounted on a lower rear portion of frame 140 adjacent to pedestal base 130. Shroud 144 is mounted on frame 140 and provides a protective cover for the parts comprising drive assembly 122.

Main boom 150 is pivotally mounted to an upper portion of frame 140 at second pivotal mounting 158. Main boom 150 is further supported on frame 140 by threaded rod 154, which is pivotally mounted to main boom 150 at first pivotal mounting 156. Fastener 157 secures an end of threaded rod 154 within first pivotal mounting 156. Threaded rod 154 extends upwardly from frame 140 and is mounted to frame 140 in a manner to be described more fully hereafter. Boom extension 152 is slidably mounted within main boom 150. Boom extension 152 is secured at a select position relative to main boom 150 by a fastener 153 acting in cooperation with holes 155 in boom extension 152. Thus, boom extension 152 may be secured at several extended positions relative to main boom 150.

Cable assembly 126 is mounted at an outer end of boom extension 152. Boom bracket 153 is secured onto an end of boom extension 152 to support the rotatable mounting of guide wheel 160 over which cable 162 passes. The inner end of cable 162 is operably connected to a spool shaft drive 222 (FIG. 2) which is rotatably mounted on drive assembly 122 and extends from drive assembly 122 through main boom 150 and boom extension 152 and passes over guide wheel 160 so that gripper end 168 of cable 162 hangs vertically downward. Gripper 164 is pivotally mounted to gripper end 168 of cable 162 by fastener 165. Gripper 164 is configured to releasably secure a handle (not shown) on a scooter to cable assembly 126 of scooter lift 100.

As previously described, frame 140 is pivotally mounted on vertical post 138 thereby permitting drive assembly 122 and boom assembly 124 to pivotally rotate relative to stationary base assembly 120. This permits any objects secured to gripper 164 to rotate with boom assembly 124 and drive assembly 122. Motor 142 drives a gear assembly that is capable of lowering and raising cable 162 via cable assembly 126 to permit the lowering and raising of a scooter secured to gripper 164.

Figure 2:
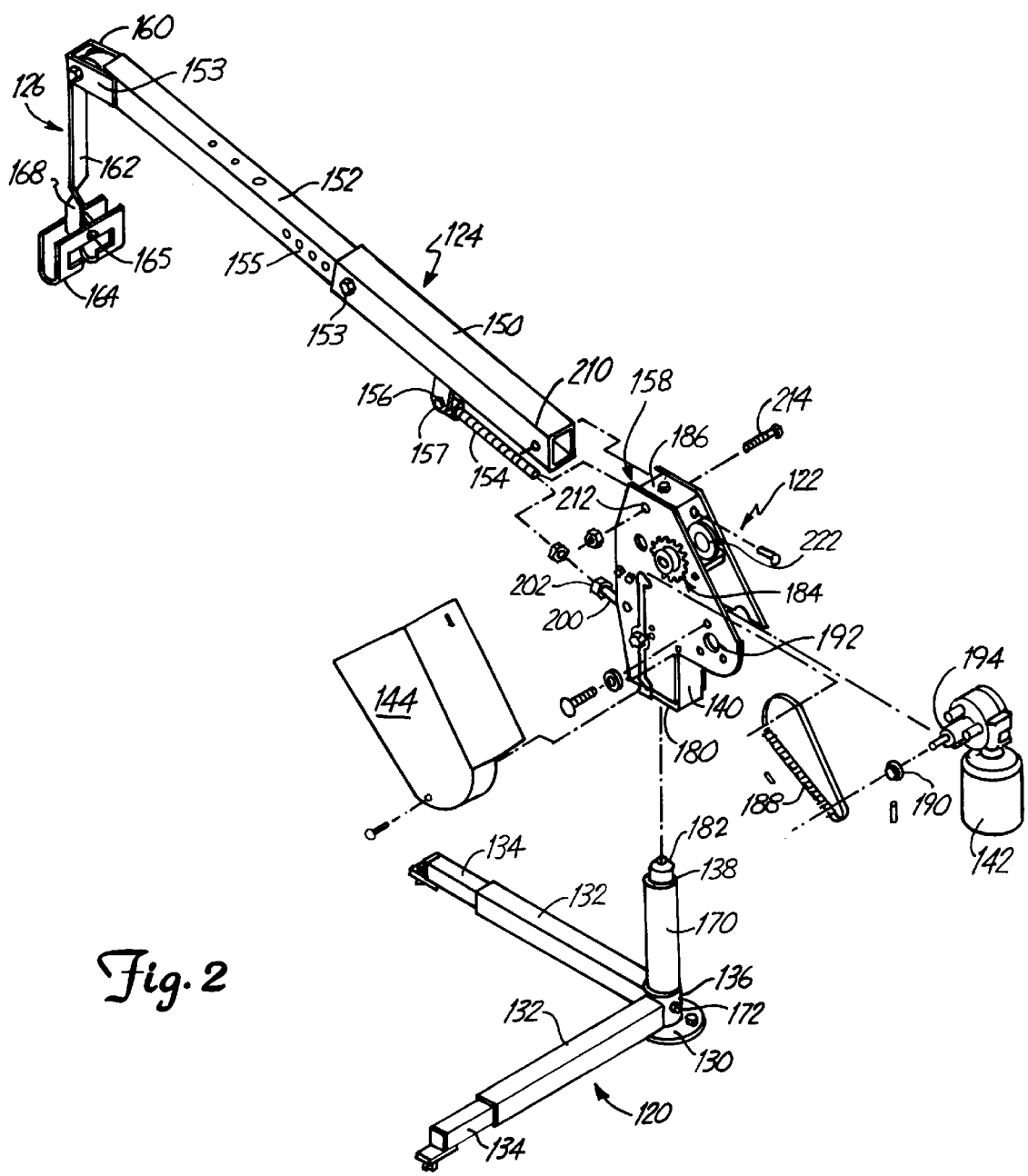
FIG. 2 is an exploded view of a scooter lift of the present invention.

As shown in FIG. 2, base assembly 120 further includes a tubular sleeve 170 that is slidably mounted over vertical post 138. Vertical post 138 is securely mounted within receptacle 136 via a fastener 172 to prevent rotation of vertical post 138 about receptacle 136. However, tubular sleeve 170 is slidably mounted on vertical post 138, and is capable of slidable rotation about vertical post 138.

FIG. 2 shows an exploded view of scooter lift 100 detailing drive assembly 122. Frame 140 of drive assembly 122 further includes a receptacle 180 for receiving vertical post 138 and tubular sleeve 170 of base assembly 120. A bearing surface 182 of vertical post 138 is received within receptacle 180 and rests on a reciprocating interior bearing surface of frame 140 to permit frame 140, and boom 150, to rotate about the axis of post 138.

Drive assembly 122 further includes a gear assembly 184 that includes the spool shaft 222 and an associated gear 186. Gear 186 is connected to motor 142 via a chain 188, a gear wheel 190, and a drive shaft 194 (mounted within a hole 192 of frame 140).

Drive assembly 122 further includes a T-bar sleeve 200, (only a portion of which is shown in FIG. 2) having a fastener 202 for connection with threaded rod 154 of boom assembly 124. T-bar sleeve 200 is a tubular sleeve sized and adapted for receiving threaded rod 154. Threaded rod 154 can be positioned relative to T-bar sleeve 200 via fastener 202 so that a select length of threaded rod 154 extends outwardly from T-bar sleeve 200, adjusting the level of incline of boom assembly 124 relative to frame 140.

Boom assembly 124 is further connected to frame 140 via second horizontal pivotal mounting 158. Second pivotal mounting 158 includes a hole 210 in main boom 150, a hole 212 in the upper portion of frame 140, and a fastening bolt 214. The upper portion of frame 140 slidably receives an end of boom main boom 150 wherein hole 210 in main boom 150 and hole 212 in frame 140 are aligned for receiving fastening bolt 214, thereby establishing a pivotal mounting of boom assembly 124 relative to frame 140.

Figure 3:
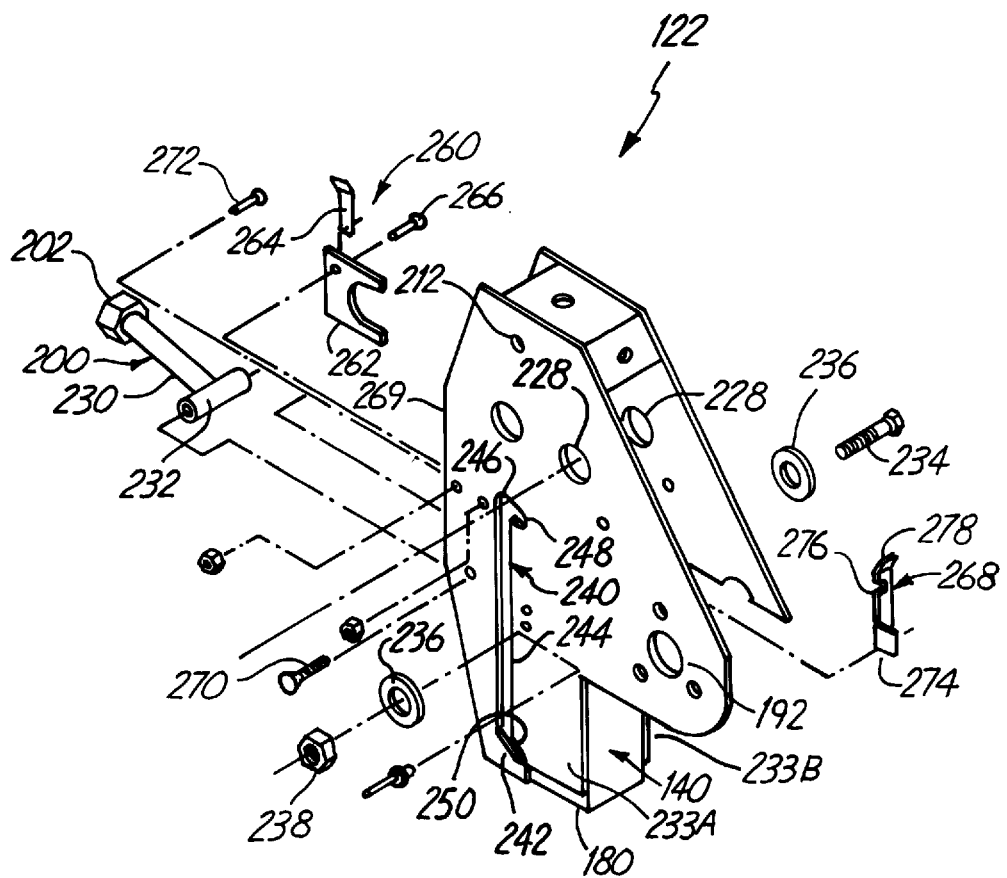
FIG. 3 is an exploded view of a drive assembly and a latch of a scooter lift of the present invention.
Figure 4:
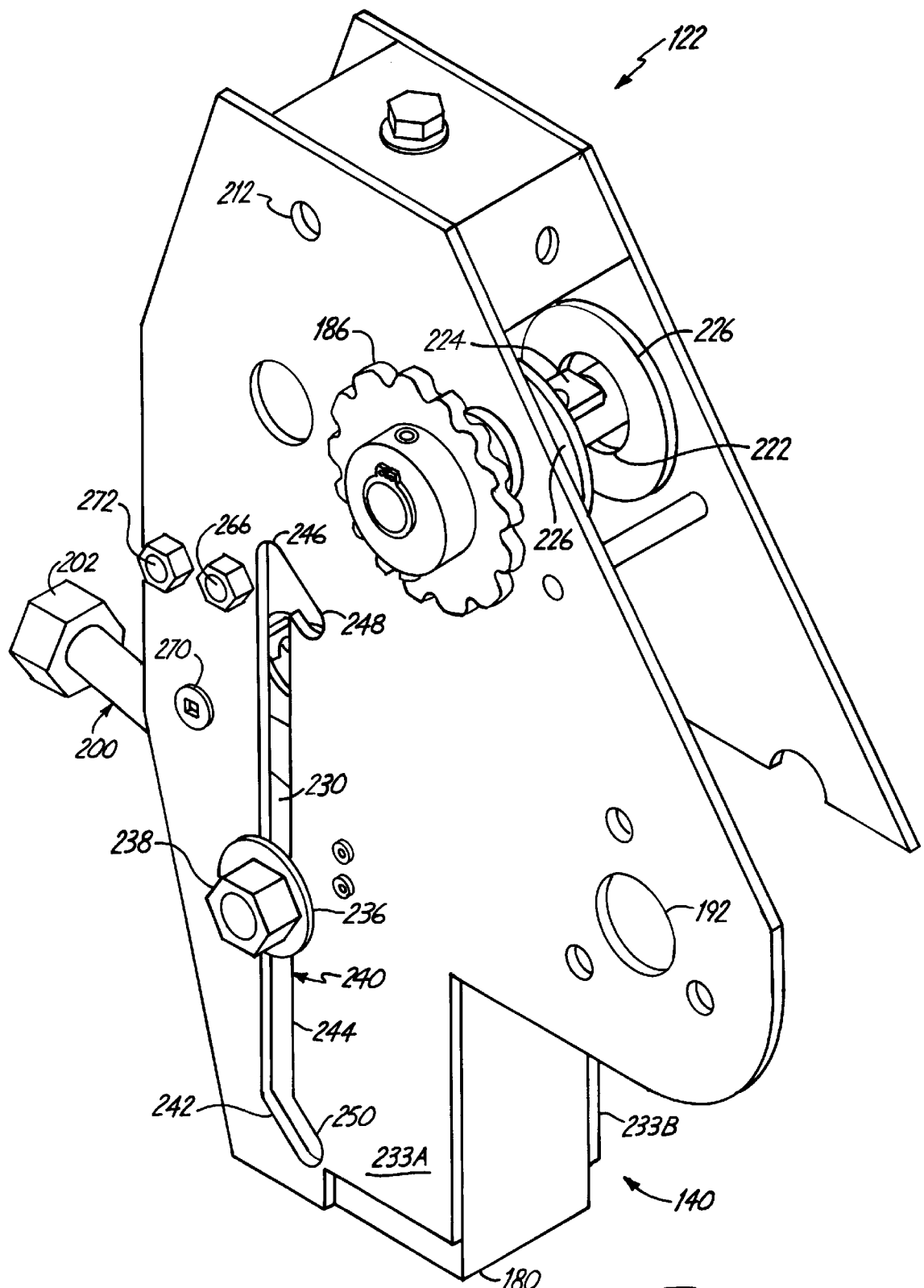
FIG. 4 is an assembled view of a drive assembly and a latch of a scooter lift of the present invention.

Drive assembly 122 is further illustrated in FIGS. 3 and 4. Gear assembly 184 further includes a pair of bushings (not shown), a spool shaft 222, through washers 226 and a pair of holes 228 to frame 140. Spool shaft 222 rotates within the bushings and is secured to gear 186 so that spool shaft 222 rotates upon rotation of gear 186. Rotation of gear 186 is controlled by gear wheel 190 (via chain 188), which rotates with rotation of drive shaft 194 of motor 142. Motor 142 is operated by a set of controls capable of causing drive shaft 194 to selectively rotate in either a clockwise or counter-clockwise direction. Fastener 224 mounts to spool shaft 222 to permit the inner end of cable 162 to be securely mounted on spool shaft 222. Accordingly, rotation of spool shaft 222, controlled by motor 142, causes cable 162 to either wind about or to unwind from spool shaft 222.

T-bar sleeve 200 (as shown in FIG. 3) is tubular and further includes a T-bar shaft 230 and a T-bar head portion 232, which is adapted to slidably receive a bolt 234. Bolt 234 has a length greater than the length of the T-bar head portion 232 so that the head of bolt 234 and the end of bolt 234 extend past the ends of T-bar head portion 232 when bolt 234 is fully inserted into T-bar head portion 232. T-bar head portion 232 of T-bar sleeve 200 has a length just less than spacing between two vertical plates 233A, 233B forming frame 140. Bolt 234 and a nut 238, in cooperation with washers 236, slidably mount T-bar head portion 232 of T-bar sleeve 200 so that T-bar head portion 232 travels in a path guided by a slot 240 in frame 140. Slot 240 of frame 140 includes a lower portion 242, a main portion 244, an upper portion 246, an upper slot recess 248, and a lower slot recess 250.

FIG. 3 also shows the components of a combination spring/latch mechanism 260 for regulating the travel of T-bar sleeve 200 relative to slot 240 of frame 140. Accordingly, this mechanism ultimately controls the movement (raising and lowering) or boom assembly 124. Spring/latch mechanism 260 includes a C-latch 262, a return coil spring 264, a pivot axis 266, a flat spring 268, a stop bolt 270 (that acts as a stop for C-latch 262), and a bolt 272 for mounting return coil spring 264. Flat spring 268 includes a mounting portion 274, a notch 276, and a taper 278 (at an upper end of flat spring 268). Flat spring 268 is made of a flexible, resilient material such as a flexible metal. The components of spring/latch mechanism 260 are mounted on a second side 269 of vertical plate 233A in a manner to be described in more detail hereafter.

FIG. 4 illustrates an enlarged view of a portion of drive assembly 122 shown in an assembled state. In particular, FIG. 4 shows the positioning of T-bar sleeve 200 as it extends outwardly from frame 140 with T-bar head portion 232 slidably secured within slot 240 by bolt 234, washers 236, and nut 238.

Figure 5:
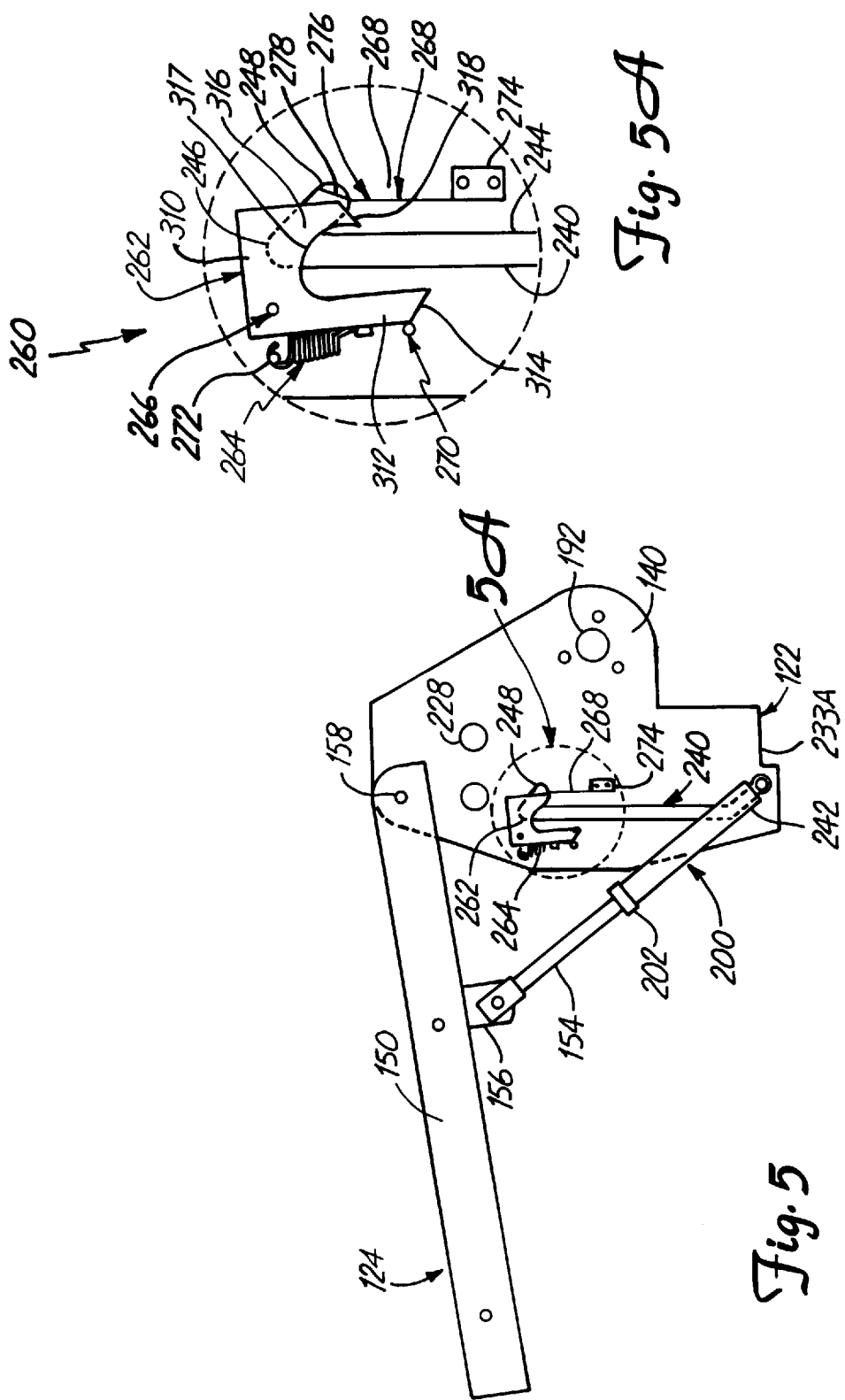
FIG. 5 is a schematic view of a boom assembly, a drive assembly, and a latch of a scooter lift of the present invention.

FIG. 5 is a schematic drawing of boom assembly 124 and drive assembly 122. FIG. 5A is an enlarged schematic drawing of spring/latch mechanism 260. Spring/latch mechanism 260 controls raising and lowering of boom assembly 124 relative to slot 240 of frame 140 of drive assembly 122. C-latch 262 includes inner base 310, a first arm 312 with a pointed end 314, and a second arm 316 with an inner curved cam surface 317 and a pointed end 318. First arm 312 and second arm 316 form a slot 320. C-latch 262 is pivotally mounted on pivot axle 266. One end of return coil spring 264 is pivotally mounted on bolt 272 while the other end of return coil spring 264 is mounted on first arm 312 of C-latch 262. Return coil spring 264 is biased to pull C-latch 262 in a clockwise direction (as viewed in FIGS. 5 and 5A). Stop bolt 270 limits movement of C-latch 262 in the clockwise direction by preventing further rotation of first arm 312 of C-latch 262 so that slot 320 generally is parallel to and aligned with main portion 244 of slot 240. In this position, first arm 312 and second arm 316 of C-latch 262 are generally on opposite sides of slot 240 with base 310 of C-latch 262 extending across upper portion 246 of slot 240. This also places inner curved surface 317 of second arm 316 directly across slot 240.

Flat spring 268 is mounted on the same side of vertical plate 233A as C-latch 262, but on an opposite side of slot 240. Spring mounting portion 274 is mounted on frame 140 below C-latch 262 so that flat spring 268 extends up to upper slot recess 248 wherein taper 278 extends across upper slot recess 248 so that flat spring notch 276 is in close proximity to and below pointed end 318 of C-latch 262 and on a side of second arm 316 opposite slot 240.

As seen from the view in FIG. 5, spring/latch mechanism 260 would ordinarily not be visible from a plan view of the exterior of vertical plate 233A of frame 140. However, for illustration purposes, C-latch 262 and flat spring 268 are depicted in FIG. 5 with solid lines to illustrate the action of spring/latch mechanism 260 with respect to movement of T-bar sleeve 200 of boom assembly 124.

Figure 6:
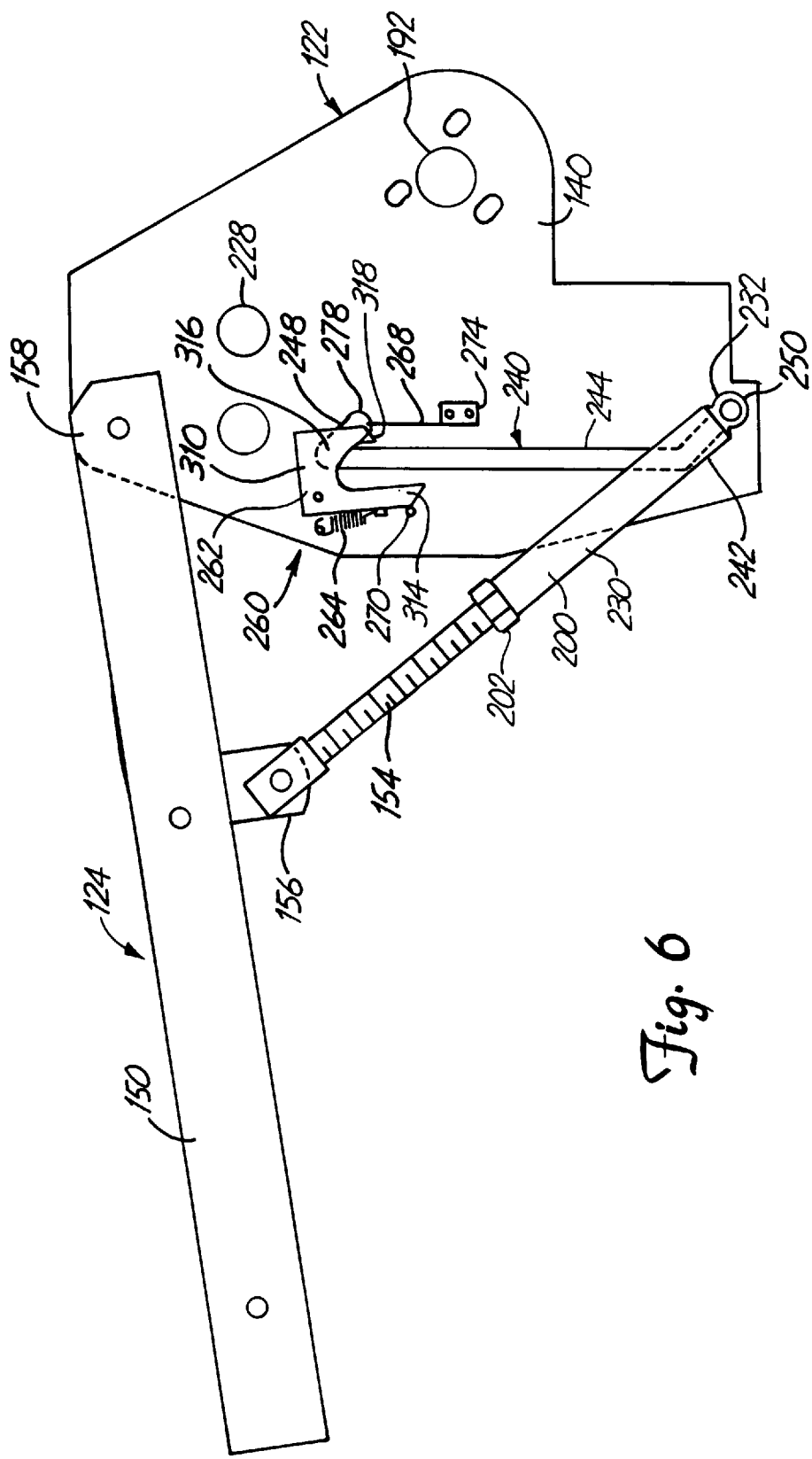
FIG. 6 is a side plan view of a boom assembly of a scooter lift of the present invention in a lowered storage position.

FIG. 6 illustrates a lowered storage position of main boom 150 of boom assembly 124. In this position, T-bar head portion 232 is positioned at lower slot recess 250 of slot 240 and does not interact with spring/latch mechanism 260.

Figure 7:
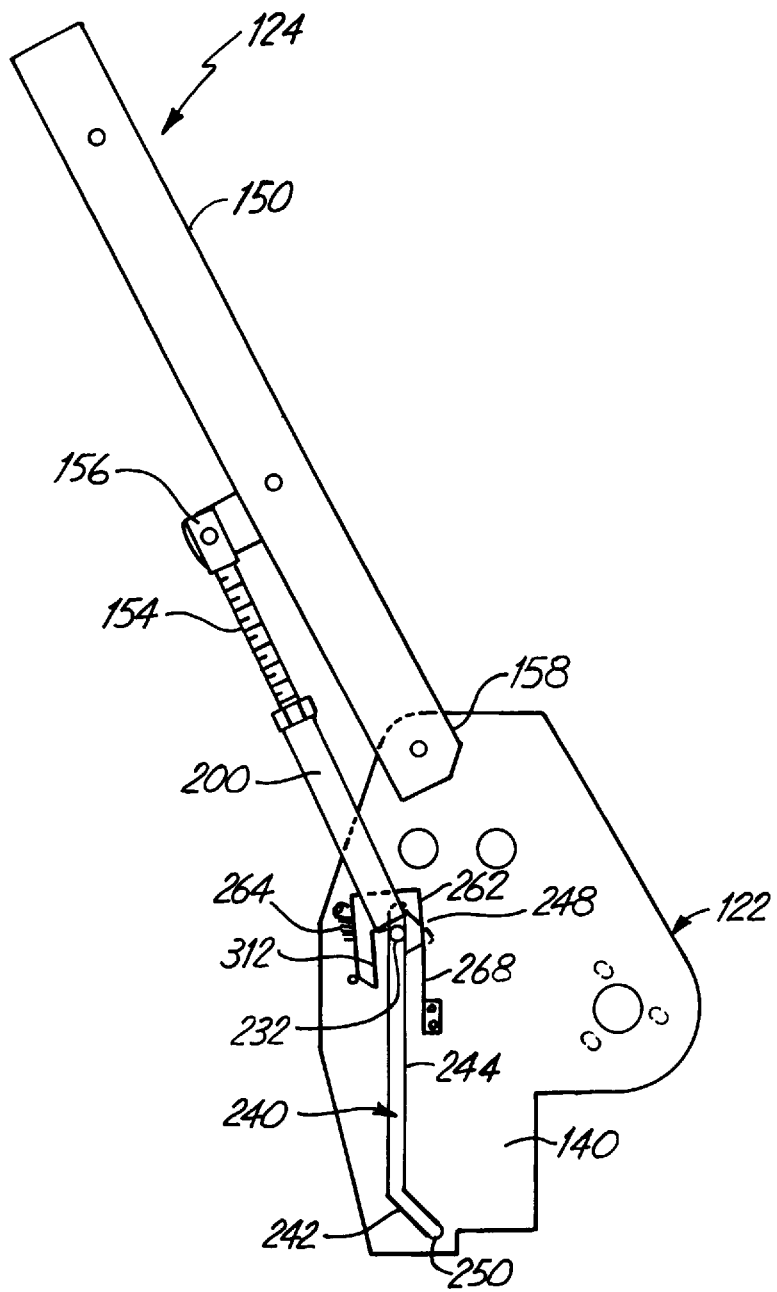
FIG. 7 is a side plan view of a boom assembly of a scooter lift of the present invention being raised from the lowered storage position in FIG. 6 toward an upper locked position.
Figure 8:
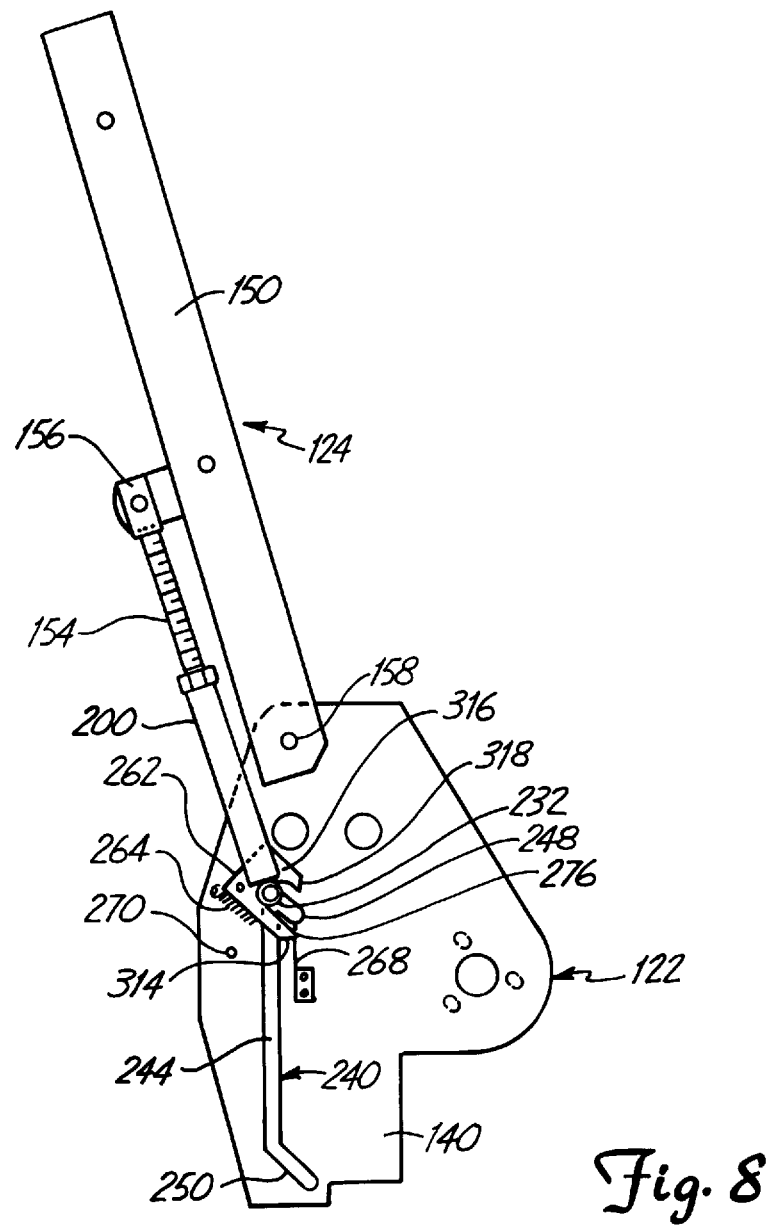
FIG. 8 is a side plan view of a boom assembly of a scooter lift of the present invention being further raised toward the upper locked position.
Figure 9:
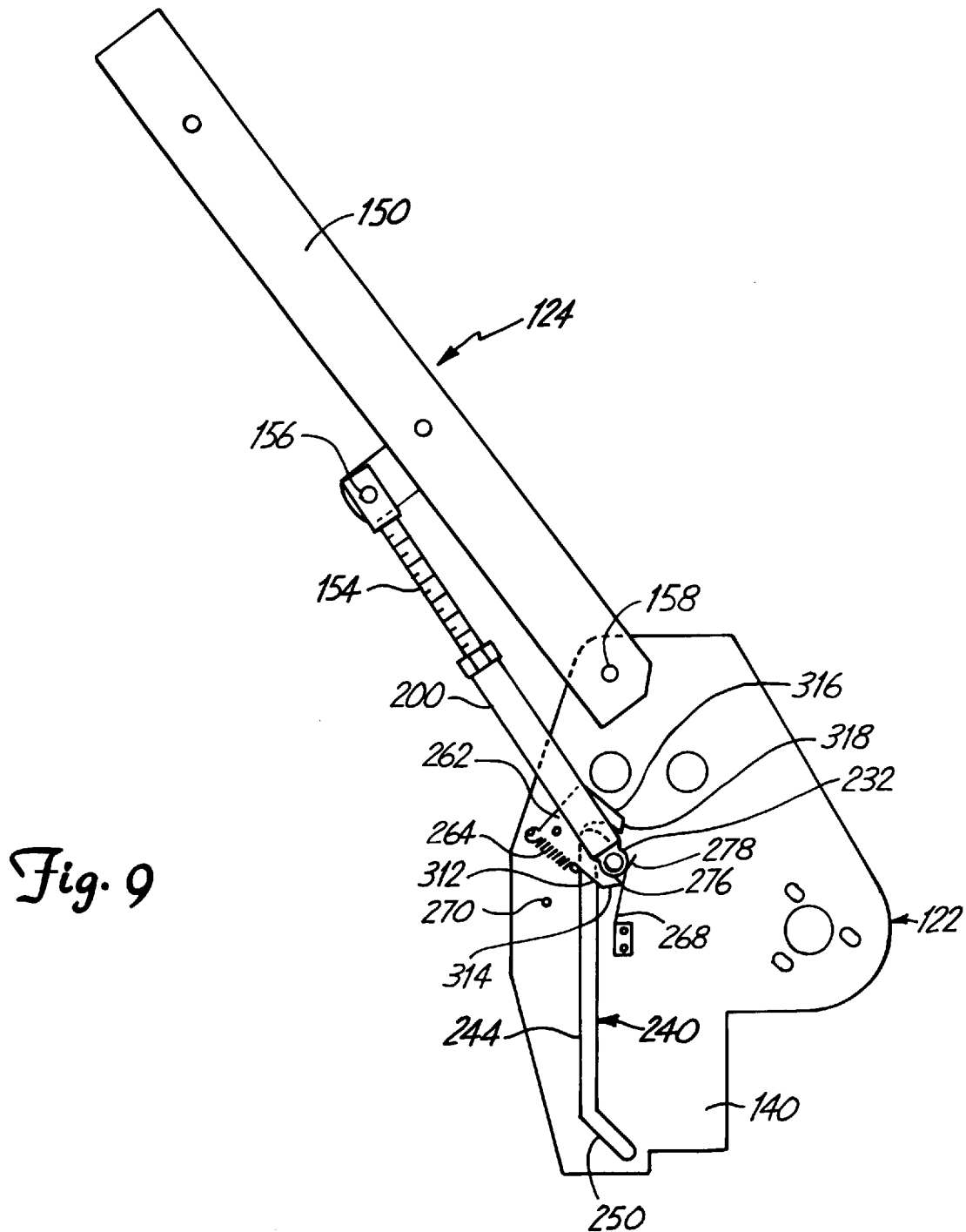
FIG. 9 is a side plan view of a boom assembly of a scooter lift of the present invention being lowered into the upper locked position from the raised position in FIG. 8.
Figure 10:
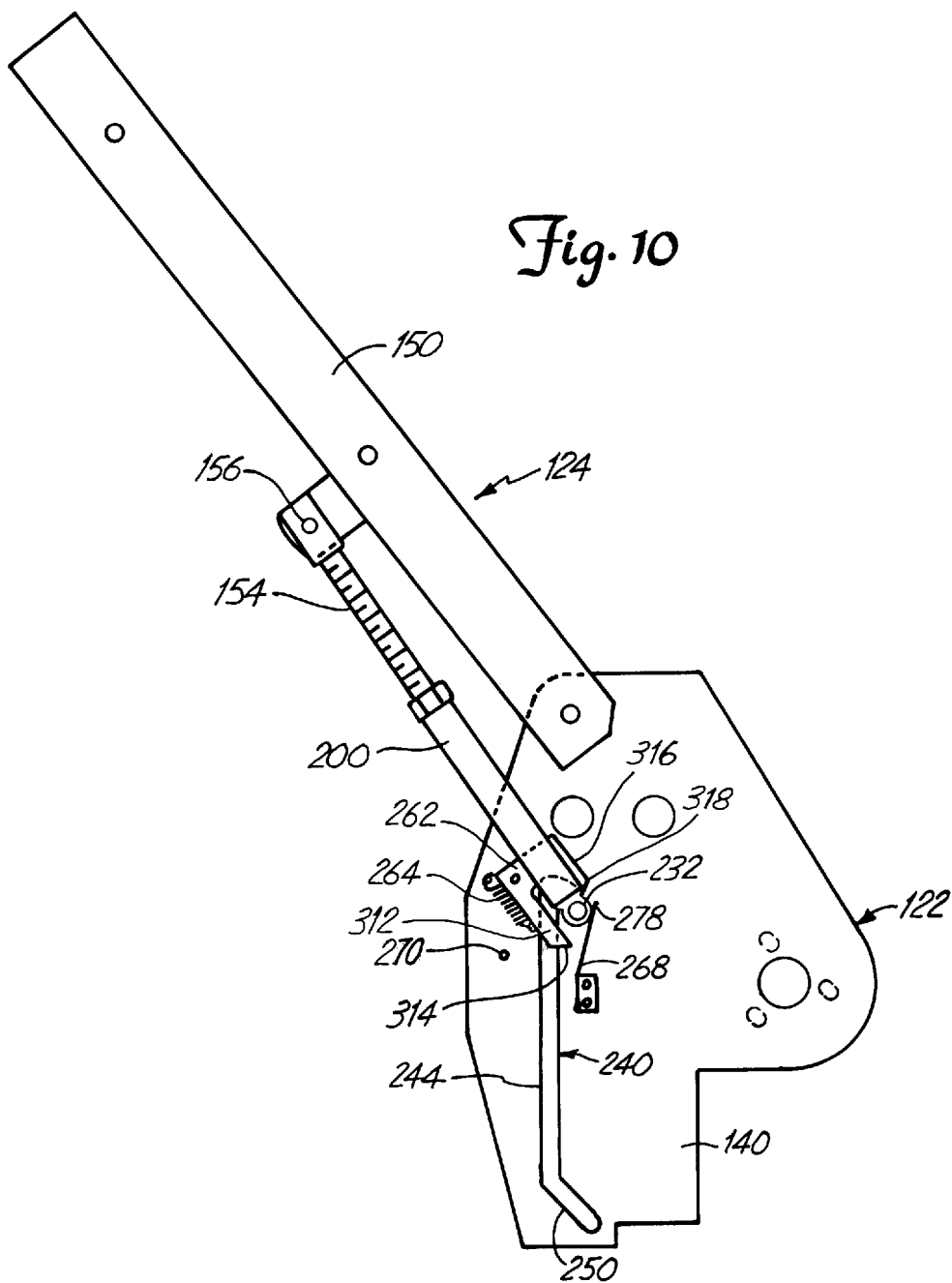
FIG. 10 is a side plan view of a boom assembly of a scooter lift of the present invention in the upper locked position.

In order to orient boom assembly 124 in a position suitable for raising a scooter off of a surface such as the ground, boom assembly 124 must be moved from the lowered storage position (FIG. 6) to an upper locked position (FIG. 10). FIGS. 7–9 illustrate the raising of main boom 150 from the lowered storage position in FIG. 6 to the upper locked position in FIG. 10. To raise boom assembly 124, a user manually lifts main boom 150 (or boom extension 152) upward. As main boom 150 is raised, T-bar head portion 232 travels upward out of the lower slot recess 250, along main portion 244 of slot 240, and upwardly adjacent to upper portion 246 of slot 240. As shown in FIG. 7, when T-bar head portion 232 nears its upper travel limit, it just begins to contact slot 320 of C-latch 262.

As shown in FIG. 8, main boom 150 is raised even further until T-bar head portion 232 presses upwardly against slot 320 and second arm 316 with sufficient pressure to cause inner curved cam surface 317 of C-latch 262 to slide against T-bar head portion 232 so that C-latch 262 rotates counter-clockwise away from stop bolt 270 against the bias force of return coil spring 264. Once T-bar head portion 232 reaches the upper most portion 246 of slot 240, C-latch 262 will rotate to a position in which pointed end 314 of first arm 312 of C-latch 262 slips into notch 276 of flat spring 268 thereby locking C-latch 262 into position relative to the flat spring 268 and relative to slot 240. With C-latch 262 locked in this position, first arm 312 of C-latch 262 blocks sliding movement of T-bar head portion 232 down main portion 244 of slot 240. Accordingly, when main boom 150 is lowered manually, T-bar head portion 232 slides downwardly into upper slot recess 248.

FIG. 9 illustrates main boom 150 being lowered manually into the upper locked position from the position shown in FIG. 8, wherein T-bar head portion 232 travels down into upper slot recess 248. As shown in FIG. 9, once T-bar head portion 232 reaches the bottom of upper slot recess 248, T-bar head portion 232 engages taper 278 of flat spring 268, thereby causing flat spring 268 to bend out of a vertical plane. As shown in FIG. 10, as main boom 150 is lowered even further, T-bar head portion 232 displaces taper 278 of flat spring 268 sufficiently so pointed end 314 of C-latch 262 is released from notch 276 of flat spring 268. Next, main boom 150 is released from manual control. As main boom 150 reaches the upper locked position, the weight of main boom 150 will maintain T-bar head portion 232 at rest within the bottom of upper slot recess 248. Since flat spring 268 is bent to an extent which releases C-latch 262, C-latch 262 tends to rotate back toward its original position by virtue of the bias of return coil spring 264. However, second arm 316 of C-latch 262 comes to rest against T-bar head portion 232, preventing C-latch 262 from fully rotating back to its original position (FIG. 6). In this upper locked position (FIG. 10), first arm 312 of C-latch 262 does not contact flat spring 268 while second arm 316 of C-latch 262 contacts T-bar head portion 232 of T-bar sleeve 200. Additionally, in this upper locked position, main boom 150 can support a significant amount of weight, such as when boom assembly 124 is used to lift scooter 104.

When it is desired to move main boom 150 from the upper locked position (FIG. 10) into the lower storage position (FIG. 6), main boom 150 is manually raised, causing T-bar head portion 232 to slide upwardly through upper slot recess 248 to the top of slot 240. As T-bar head portion 232 slides upwardly in upper slot recess 248, it maintains the position of C-latch 262 in the orientation shown in FIG. 11.

Figure 11:
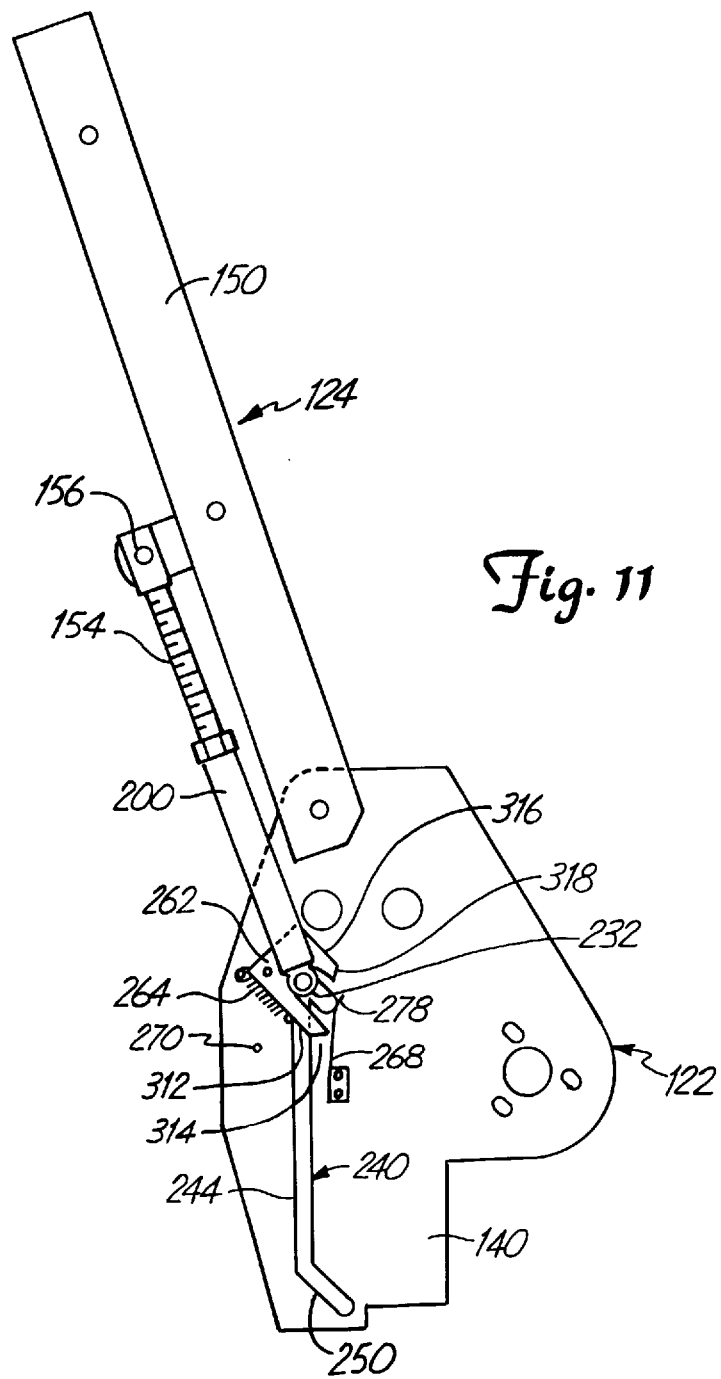
FIG. 11 is a side plan view of a boom assembly of a scooter lift of the present invention moving from the upper locked position in FIG. 10 to the lowered storage position in FIG. 6.

From the position shown in FIG. 11, C-latch 262 is no longer locked in place relative to flat spring 268. This permits main boom 150 to be manually lowered as C-latch 262 rotates back to its original position (FIG. 6), allowing T-bar head portion 232 to travel down slot 240 into lower slot recess 250. Lowering main boom 150 causes C-latch 262 to return to its original position (FIG. 6) with first arm 312 resting against stop bolt 270.

In use, scooter lift 100 is mounted in a storage portion of a vehicle or in a trunk of the vehicle. Scooter lift 100 is maintained within the vehicle in the storage lower position corresponding to FIG. 6 in which main boom 150 is in its lowered position. Once it is desired to use scooter lift 100 to retrieve a scooter outside the vehicle, boom assembly 124 and drive assembly 122 are rotated relative to base assembly 120 so that boom assembly 124 extends outside of the vehicle. With boom assembly 124 extending outside of the vehicle, boom assembly 124 is moved from the lower storage position shown in FIG. 6 to the upper locked position shown in FIG. 10 by following the sequence shown in FIGS. 7, 8, and 9. Maneuvering boom assembly 124 to the upper locked position (FIG. 10) requires one simple motion. Specifically, the user merely pieces his or her hand on boom assembly 124 (either main boom 150 or boom extension 152), and lifts boom assembly 124 upwardly until T-bar head portion 232 engages inner curved surface 317 of C-latch 262, thereby causing C-latch 262 to rotate and to engage flat spring 268 thereby locking C-latch 262 into the position shown in FIG. 8. This permits T-bar head portion 232 to slide downwardly into upper slot recess 248 resulting in boom assembly 124 being locked into the upper locked position as shown in FIG. 10.

With boom assembly 124 in this position, cable 162 can be lowered from boom extension 152 by operating motor 142 of drive assembly 122 so that gripper 164 of cable assembly 126 is lowered into close proximity a scooter. The user then manipulates a scooter engagement apparatus (not shown) to secure the scooter to the gripper 164. Next, the user operates motor 142 to cause cable 162 to be raised thereby lifting the scooter off the ground or platform surface. Cable 162 is raised until the scooter is off the ground or at a height sufficient to clear a lip or entry way of the vehicle storage area. Once in an adequately raised position, the user no longer raises cable 162 and instead merely pushes boom assembly 124 to rotate boom assembly 124 into the storage area in the vehicle. Drive assembly 122, including frame 140, is configured and arranged so that once slidably mounted on base assembly 120, boom assembly 124 pivots easily with the weight of the scooter so that by a single motion of the arm, the user can rotate the scooter into the storage area of the vehicle.

Once the scooter is within the storage area of the vehicle, the user can slightly lower cable 162, causing the scooter to come to rest on the storage surface of the vehicle.

To remove the scooter from the vehicle, this process is simply reversed so that the scooter is raised minimally off the surface of the vehicle's storage area by slightly raising cable 162. Boom assembly 124 is rotated outwardly form the vehicle to rotate the scooter to a location outside the storage area of the vehicle. The user then manipulates a set of controls to operate motor 142 for lowering cable 162 until the scooter rests on the ground. The scooter engagement apparatus is then manipulated to release the scooter from connection to the gripper 164. With the scooter removed from scooter lift 100, boom assembly 124 can be moved from the upper locked position (FIG. 10) into the lower storage position (FIG. 6). This is done merely by slightly raising boom assembly 124 manually so that T-bar head portion 232 lifts out of the upper slot recess 248 and into the position shown in FIG. 11. This permits boom assembly 124 to be lowered from the upper storage position to the generally horizontal lower storage position (FIG. 6). Boom assembly 124 is then rotated into the storage area of the vehicle.

Scooter lift 100 of the present invention provides numerous advantages. Foremost, the scooter lift provides simple manipulation between the lower storage position and the upper locked position wherein a user can maneuver the scooter lift into either one of these two positions by merely manually raising or lowering boom assembly 124. A combination spring/latch mechanism 260 controls the movement of boom assembly 124 to permit the locking and unlocking of boom assembly 124 between the two positions. Scooter lift 100 of the present invention is also extremely simple to assemble and manipulate as desired. For example, once base assembly 120 is mounted in a vehicle or the entire drive assembly 122 and boom assembly 124 can be removed form the vehicle by merely lifting drive assembly 122 directly off vertical post 138 of base assembly 120. Reassembling scooter lift 100 simply requires aligning frame 140 of drive assembly 122 over the vertical post 138 of base assembly 120 and then lowering drive assembly 122 over vertical post 138. From this position, drive assembly 122 and boom assembly 124 are free to pivotally rotate relative to base assembly 120. In addition, the length of boom assembly 124 can be adjusted by adjusting the length by which boom extension 152 is selectively secured with respect to main boom 150. The general angle of incline of boom assembly 124 can be adjusted by manipulating threaded rod 154 and fastener 202 on T-bar sleeve 200 to select a desired length by which threaded rod 154 extends out of T-bar shaft 230 of T-bar sleeve 200.

The invention provides a scooter lift that can be operated with one hand to lift a personal mobility scooter into or out of a storage area of a vehicle, and is compact so that it can be stowed in the same storage area. The scooter lift can be mounted in the storage trunk of an automobile to lift a scooter into and out of storage therein. The scooter lift is particularly useful with personal mobility scooters that disassemble for storage in automobile storage trunks, as the scooter can be nested over the base of the lift with the boom over the scooter for compact storage of both the scooter and the lift. The user can, with a single hand and without significant effort, raise the boom, connect the gripper to the scooter, operate the cable motor to lift or lower the scooter, and swing the scooter into and out of the storage area. Thus, the scooter lift is easily operated by persons with limited physical strength or movement.

Although the present invention has been described with reference to preferred embodiments, workers skilled in the art will recognize that changes may be made in form and detail without departing from the spirit and scope of the invention.

What is claimed is:

1. A scooter lift for lifting a scooter into a storage area of a transport vehicle, the scooter lift comprising:

a base assembly for mounting on a surface of the storage area of the transport vehicle;

a frame mounted on the base assembly for rotation about a substantially vertical axis;

a boom mounted to the frame for rotation about a substantially horizontal axis between a lowered position and a raised position;

a cable having a first end connected to a spool shaft and a second end for attachment to the scooter, the cable being guided by the boom to selectively raise or lower the scooter upon rotation of the spool shaft, an engagement member attached to the boom and moveable between a lower rest position and an upper position and between the upper position and a lock position, the boom being in its raised position to enable movement of the scooter into and out of the storage area when the engagement member is in its lock position and being in its lowered position to permit storage of the scooter lift in the storage area when the engagement member is in its lower rest position; and a slot in the frame engaging the engagement member, the slot having a vertical main portion defining the lower rest position and the upper position of the engagement member and having a slot recess extending from the upper position and defining the lock position of the engagement member.

2. The scooter lift of claim 1, including a directional means mounted to the frame to direct the engagement member from its upper position toward its lock position and to block movement of the engagement member from its upper position toward its lower rest position when the engagement member is moved from its lower rest position to the upper position, and to release blockage of movement of the engagement member from its upper position to its lower rest position when the engagement member is in its lock position so that when the engagement member is moved from its lock position to the upper position the engagement member is permitted to move to its lower rest position.

3. The scooter lift of claim 1, including a boom extension slidably mounted to the boom, the cable being guided by the boom and boom extension.

4. The scooter lift of claim 1, including a threaded rod pivotally attached to the boom and frame.

5. A scooter lift for lifting a scooter into a storage area of a transport vehicle, the scooter lift comprising:

a base assembly for mounting on a surface of the storage area of the transport vehicle;

a frame mounted on the base assembly for rotation about a substantially vertical axis;

a boom mounted to the frame for rotation about a substantially horizontal axis between a lowered position and a raised position;

a cable having a first end connected to a spool shaft and a second end for attachment to the scooter, the cable being guided by the boom to selectively raise or lower the scooter upon rotation of the spool shaft, wherein the boom may be operated to its raised position to enable movement of the scooter into and out of the storage area and the boom may be operated to its lowered position to permit storage of the scooter lift in the storage area;

an engagement member attached to the boom and moveable between a lower rest position and an upper position and between the upper position and a lock position, the boom being in its raised position when the engagement member is in its lock position and being in its lowered position when the engagement member is in its lower rest position;

a slot in the frame engaging the engagement member, the slot having a vertical main portion defining the lower rest position and the upper position of the engagement member and having a slot recess extending from the upper position and defining the lock position of the engagement member; and directional means mounted to the frame to direct the engagement member from its upper position toward its lock position and to block movement of the engagement member from its upper position toward its lower rest position when the engagement member is moved from its lower rest position to the upper position, and to release blockage of movement of the engagement member from its upper position to its lower rest position when the engagement member is in its lock position so that when the engagement member is moved from its lock position to the upper position the engagement member is permitted to move to its lower rest position, the directional means further comprising a C-plate having an arm pivotally arranged to direct the engagement member into the slot recess when the engagement member travels the main portion to the upper position; and a first spring urging the C-plate to permit the engagement member to travel the main portion from the upper position upon movement from the lock position.

6. The scooter lift of claim 5, wherein the C-plate has an arm and a cam surface, the engagement member engaging the cam surface when moved from its lower rest position to its upper position causing the C-plate to pivot to position the arm to block the main portion of the slot to prevent movement of the engagement member from the upper position to the lower rest position.

7. The scooter lift of claim 6, including an arm lock engaging the arm of the C-plate when the C-plate is pivoted to block the main portion of the slot, thereby preventing the C-plate from rotating to a position wherein the arm does not block the main portion.

8. The scooter lift of claim 7, wherein the arm lock comprises a second spring having a notch for engaging the arm of the C-plate, the second spring being operable in response to the engagement member in its lock position to disengage the arm of the C-plate from the notch, whereby the first spring urges the C-plate toward a position to permit the engagement member to move from the upper position to the lower rest position so that upon movement of the engagement member to the upper position from the lock position the boom may be moved to its lowered position.

9. A scooter lift for lifting a scooter into a storage area of a transport vehicle, the scooter lift comprising:

a base assembly for mounting on a surface of the storage area of the transport vehicle;

a frame mounted on the base assembly for rotation about a substantially vertical axis;

a boom mounted to the frame for rotation about a substantially horizontal axis between a lowered position and a raised position;

a cable having a first end connected to a spool shaft and a second end for attachment to the scooter, the cable being guided by the boom to selectively raise or lower the scooter upon rotation of the spool shaft, wherein the boom may be operated to its raised position to enable movement of the scooter into and out of the storage area and the boom may be operated to its lowered position to permit storage of the scooter lift in the storage area;

a slot in the frame, the slot having a substantially vertical main portion having an upper position and a slot recess depending from the upper position to define a lock position;

an engagement member within the slot, the engagement member being attached to the boom, the engagement member being moveable within the slot between a lower rest position and an upper position and between the upper position and the lock position, the lower rest position being at an end of the main portion of the slot opposite the upper position, the boom being in its raised position when the engagement member is in its lock position and being in its lowered position when the engagement member is in its lower rest position, a C-plate pivotally mounted to the frame to direct the engagement member into the slot recess when the engagement member travels the main portion to the upper position, and a first spring urging the C-plate to permit the engagement member to travel the main portion from the upper position upon movement from the lock position.

10. The scooter lift of claim 9, including an adjustable rod pivotally attached between the boom and engagement means.

11. The scooter lift of claim 9, wherein the C-plate has an arm and a cam surface, the engagement member engaging the cam surface when moved from its lower rest position to its upper position causing the C-plate to pivot to position the arm to block the main portion of the slot to prevent movement of the engagement member from the upper position to the lower rest position.

12. The scooter lift of claim 11, including an arm lock engaging the arm of the C-plate when the C-plate is pivoted to block the main portion of the slot, thereby preventing the C-plate ;;from rotating to a position wherein the arm does not block the main portion of the slot.

13. The scooter lift of claim 12, wherein the arm lock comprises a second spring having a notch for engaging the arm of the C-plate, the second spring being operable in response to the engagement member in its lock position to disengage the arm of the C-plate from the notch, whereby the first spring urges the C-plate toward a position to permit the engagement member to move from the upper position to the lower rest position so that upon movement of the engagement member to the upper position from the lock position the boom may be moved to its lowered position.

14. A scooter lift for lifting a scooter into a transport vehicle, the scooter lift comprising:

a base assembly for mounting on a surface of the storage area of the transport vehicle;

a frame mounted on the base assembly for rotation about a substantially vertical axis;

a boom mounted to the frame and movable between a raised position and a lowered position;

a cable having a first end connected to a spool shaft and a second end for attachment to the scooter, the cable being guided by the boom to selectively raise or lower the scooter upon rotation of the spool shaft;

a slot in the frame containing an upper slot recess, a main slot portion, and a lower slot recess; and a slot member attached to the boom to travel within the slot, wherein when the boom is in its lowered position the weight of the boom along retains the slot member in the lower slot recess, and wherein when the boom is in its raised position the weight of the boom along retains the slot member in the upper slot recess.

15. A scooter lift for lifting a scooter into a transport vehicle, the scooter lift comprising:

a base assembly for mounting on a surface of the storage area of the transport vehicle;

a boom movable between raised and lowered positions;

a cable having a first end connected to a spool shaft and a second end for attachment to the scooter, the cable being guided by the boom to selectively raise or lower the scooter upon rotation of the spool shaft;

means for positioning the boom relative to the base assembly, wherein the positioning means further comprises a frame mounted to the base assembly to rotate the about a vertical axis, a slot in the frame containing an upper slot recess, a main slot portion, and a lower slot recess, and a slot member attached to the boom to travel within the slot;

means for locking the boom in its raised position;

a latch located adjacent the upper slot recess, the latch having a first position and a locked position, and a cam surface on the latch engagable by the slot member to move the latch to its locked position, wherein the latch prevents the slot member from moving in the main slot portion when the latch is in its locked position, thereby locking the boom in its raised position.

16. The scooter lift of claim 15, including a latch spring arranged to engage the latch when the latch is in its locked position, the slot member engaging the latch spring to disengage the latch when the boom is in its raised position, and a return spring coupled to the latch to bias the latch toward the first position.

* * * * *